May 12, 1964     A. B. HOOD     3,133,277
VEHICLE SEAT BELT
Filed July 1, 1963
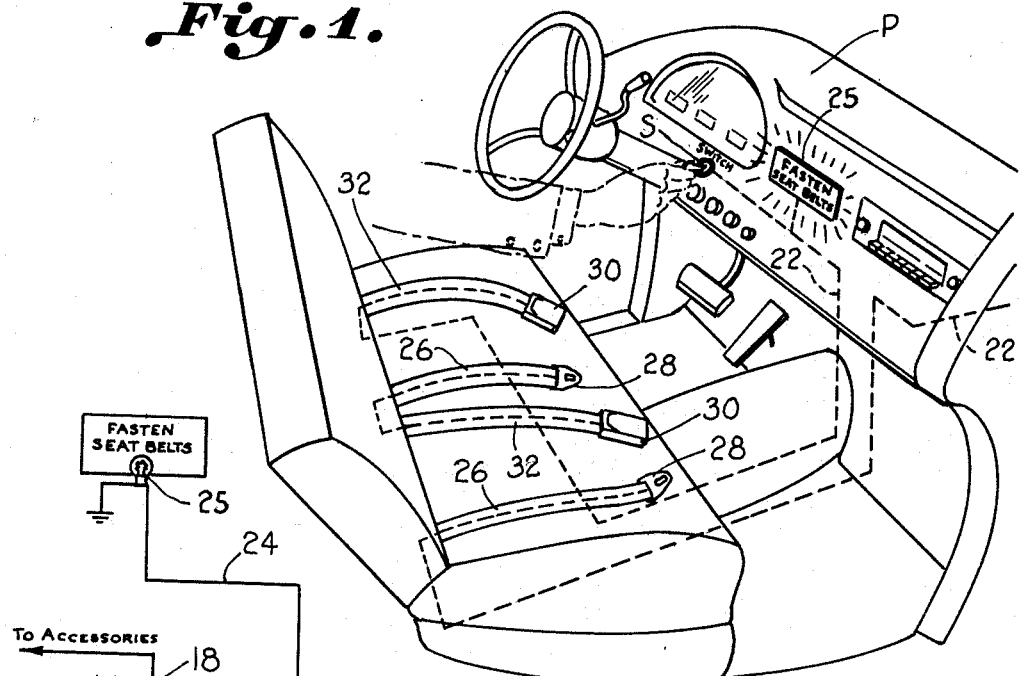
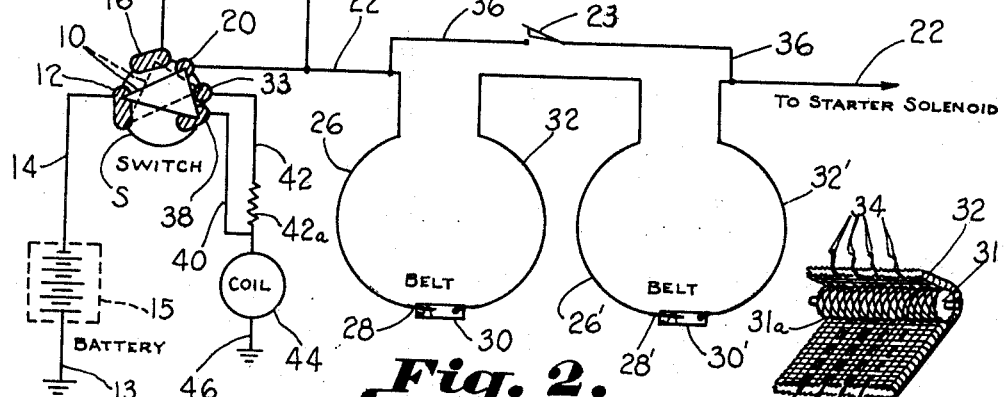
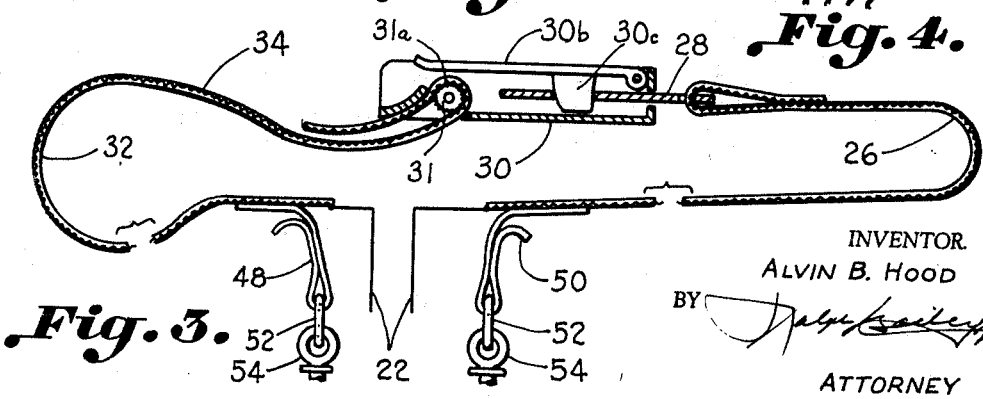
INVENTOR.
ALVIN B. HOOD
BY
ATTORNEY

United States Patent Office 3,133,277
Patented May 12, 1964

3,133,277
VEHICLE SEAT BELT
Alvin B. Hood, Rte. 3, Taylors, S.C.
Filed July 1, 1963, Ser. No. 291,616
2 Claims. (Cl. 340—278)

This invention relates to an improved vehicle seat belt structure with means assuring the fastening of the seat belt.

Former seat belt constructions have been made in which conductive elements associated with the straps are so interposed in the ignition system that separation of the conductive elements, as might result from an accident, de-energizes the ignition system. Not only must such conductive elements be joined in order to start the vehicle but also they must remain joined for the vehicle once started to continue to run. No means has been provided indicating the cause of the failure of the vehicle to start as being failure to fasten a seat belt. Former electrical connections have been relatively complicated and unsightly.

Accordingly, it is an important object of this invention to provide an improved seat belt construction assuring the fastening of the belt before starting the vehicle.

Another important object of the invention is the provision of a seat belt construction having the above advantage which will not interfere with the normal operation of a vehicle once running.

Still another important object of the invention is to conveniently, safely and unobtrusively position the seat belt conductors.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIGURE 1 is a perspective view illustrating a vehicle seat belt construction in accordance with the invention in an automobile, FIGURE 2 is a circuit diagram illustrating the various electrical components and connections diagrammatically, FIGURE 3 is an enlarged plan view illustrating details of the seat belt construction, and FIGURE 4 is an enlarged perspective view illustrating a means for making electrical contact between a fastening element and a strap.

The drawing illustrates a vehicle seat belt having a pair of straps 26 and 32 constructed of woven insulating material with fastening elements in the form of a buckle including a housing 30 and a tongue 28 of conductive material attached to each normally free strap end. The seat belt is shown installed in an automobile having an instrument panel P carrying the usual starter switch S. Conductive material 34 is woven into the insulating material of the straps. The conductive material woven into the straps is interposed in an electrical circuit which must be closed for normal starting of the vehicle. Means establishing electrical contact between the conductive material of the fastening elements and the conductive material woven into the straps includes the roller 31 and the tongue 28. An insulating material 48 and 50 is connected to the other ends of the straps, and fastening means 52 and 54 secures the insulating material connected to the other ends of the straps to the vehicle. Thus, the joining of the fastening elements connecting the normally free ends of the straps completes the electrical circuit for normal starting. The electrical circuit into which the conductive material 34 is interposed is the starter circuit which is independent of the ignition and normally de-energized during normal running of the vehicle. Electrically operated signalling means 25, carried by the panel P, is energized responsive to actuation of the starter switch when the fastening elements are not joined indicating that the seat belt is not fastened. Such signalling means is in parallel with the conductive material 34.

Referring in particular to FIGURE 2, and that portion of the ignition system of a typical automobile consisting of the circuit which is required to start the automobile, it will be noted that the starter or ignition switch S is schematically shown as a round disc with five contact points. The movable portion of the switch is shown as a triangular shape 10, in solid lines in the "start" position, and in dotted lines in the "run" position. To the conductor 22 to the starter solenoid has been added a conductor 24 to a bulb 25 which is grounded to the automobile frame. Thus, a circuit with a signal light and warning indicia "Fasten Seat Belts" or other suitable indicia, is actuated when the switch is turned to the "start" position, and the connection 22 is broken to the starter solenoid.

It will be observed that the battery 15 is grounded at 13 and connected by the conductor 14 to the contact point 12 of the starter switch S. The contact point 16 is connected to various accessories by the conductor 18. The contact point 20 is connected by the conductor 22 as described herein. The coil 44 of the ignition circuit which is grounded at 46, is connected to contact point 33 through the line 42 having resistance 42a therein and to contact point 38 through the line 40.

Into the circuit between the starter switch and the starter solenoid any desired number of seat belt segments 26 and 32 are interposed. An indefinite number of such segments are schematically represented by corresponding numerals with prime notations corresponding to those employed in the belt described. Conductors 34 in the form of wires woven into the insulating fabric of the belt must be joined by fastening the buckles in order to complete the circuit and start the car. A preferred construction of these belts is shown in greater detail in FIGURE 3. FIGURE 4 shows a portion of the buckle side of the belt 32 with a plurality of electrical wires 34 woven into the surface of the webbing of the belt, where the knurled points 31a of the metal roller 31 can make contact with the conductors 34 and make electrical contact with the buckle 30 so as to complete the circuit when the metal tongue 28 of belt 26 is inserted. The buckle may be fastened by depressing the lever 30b carrying projection 30c. Since the belts are in series, all the belts must be fastened before the solenoid may be energized to start the car. The electrically wired belts are insulated from the metal portion of the automobile by having sections of non-conductive belt 48 and 50 attached to their anchored end at anchor elements 52 and 54 in FIGURE 3.

Referring again to FIGURE 2, an optional "jumper" wire 36 with a normally open switch 23 is illustrated. This switch may be closed to bypass the safety belt circuit if an occasion should ever arise where this is desirable.

Thus, unlike other designs, this structure does not interfere with the normal operation of the vehicle, since after the switch is returned to the "run" position the circuit is de-energized. Such structure is intended simply to provide a reminder and warning to all passengers to fasten their sceat belts, because the motor will not start until this has been done. As stated earlier, if a belt is unfastened, the only result from the turning of the switch to "start" will be for the warning light to come on.

While a preferred embodiment of the invention has been described using specific terms, such description is for illustrative purposes only, and it is to be understood that changes and variations may be made without departing from the spirit or scope of the following claims.

What is claimed is:

1. In combination with a vehicle seat belt having a pair of straps with fastening elements of conductive material attached to each normally free strap end, said vehicle having an electrical starter circuit energized by a starter switch and de-energized during running of the vehicle, conductive material interposed in series in the starter circuit connected to the fastening elements attached to each free strap end so that joining of the fastening elements connecting the normally free ends of the straps completes the starter circuit for normal starting, and an electrically operated signalling means in parallel with the conductive material in the starter circuit connected to the fastening elements energized responsive to actuation of the starter switch.

2. In a vehicle seat belt having a pair of straps constructed of woven insulating material with fastening elements of conductive material attached to each normally free strap end, said vehicle having an electrical starter circuit energized by a starter switch and de-energized during running of the vehicle, the improvement including, conductive material woven into the insulating material of the straps, said conductive material woven into the straps being interposed in series in the starter circuit which must be closed for normal starting of the vehicle responsive to actuation of the vehicle starter switch, means establishing electrical contact between the conductive material of the fastening elements and the conductive material woven into the straps, an insulating material connected to the other ends of the straps, means securing the insulating material connected to said other ends to the vehicle, and electrically operated signalling means energized responsive to actuation of the starter switch, whereby joining the fastening elements connecting the normally free ends of the straps completes the electrical circuit for normal starting.

References Cited in the file of this patent

UNITED STATES PATENTS

| | | |
|---|---|---|
| 2,802,073 | Simon | Aug. 6, 1957 |
| 2,824,293 | Meinhardt | Feb. 18, 1958 |
| 2,904,774 | Bossarte | Sept. 15, 1959 |